Oct. 31, 1933.  J. J. McCARTHY  1,932,630
WINDSHIELD WIPER WITH REMOVABLE BLADES
Filed Aug. 30, 1930
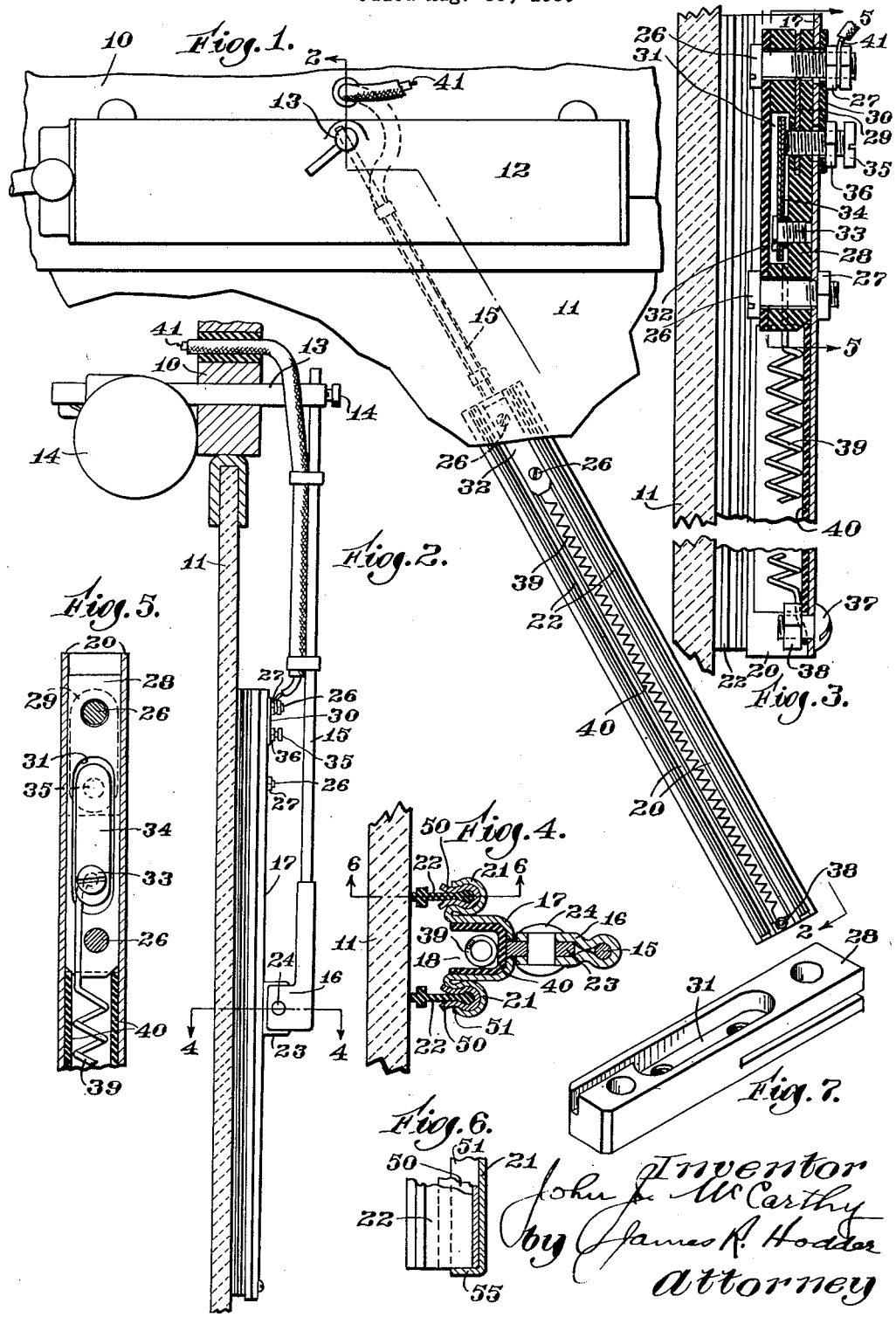

Patented Oct. 31, 1933

1,932,630

UNITED STATES PATENT OFFICE 1,932,630

WINDSHIELD WIPER WITH REMOVABLE BLADES

John J. McCarthy, Malden, Mass.

Application August 30, 1930. Serial No. 478,925

1 Claim. (Cl. 15—250)

My present invention is a novel and improved windshield wiper for motor vehicles and the like and is an improvement on my prior and copending applications, Serial Nos. 264,464, filed March 24, 1928, and 445,284, filed April 18, 1930.

While my present invention is mostly intended for use with a duplex and heated windshield wiper, such as, for example, illustrated in my said prior applications, yet in its broader aspects it is adaptable for use on a single wiper, and either in connection with the application of heat to the wiper or windshield or without same.

Important features of the present invention consist in the construction and arrangement of a windshield wiper to permit quick attachment and detachment, removable and renewable, as well as interchangeable wiping blades and the wiper itself.

My present invention of quickly attachable and detachable wiper blade construction is of special importance in connection with my duplex type of windshield wiper, as shown in my said prior constructions, wherein the heating instrumentalities are interposed between the projecting and protecting portions of the pair of windshield engaging devices.

Further features of the present invention consist in the simplicity and compactness of construction; capability of utilizing present types of windshield blades interchangeably with my wiper construction, and additional features of heat retention and radiation by the increased protection and mass of metal immediately adjacent the heating element to conserve the heat supplied, as well as to direct the same onto that part of the glass or windshield being operated upon by the wiper.

Referring to the drawing illustrating the preferred embodiment of the present invention, Fig. 1 is a view of the portion of the windshield showing my device in position thereon;

Fig. 2 is a cross-sectional view on the line 2—2 of Fig. 1;

Fig. 3 is an enlarged cross-sectional view of a portion of the wiper and heating elements having thermostatic control;

Fig. 4 is a fragmentary cross-sectional view on the line 4—4 of Fig. 2 of the wiper blades in position on a portion of the windshield gass;

Fig. 5 is a cross-sectional view on the line 5—5 of Fig. 3;

Fig. 6 is a fragmentary cross-sectional view on the line 6—6 of Fig. 5, and

Fig. 7 is a perspective view of the thermostatic holding element.

In illustrating my present invention I have applied the same to a type of duplex wiping apparatus with thermostatic control, as illustrated in my said prior application Ser. No. 445,284, and I will, therefore, describe the complete windshield wiping element, heating apparatus, and thermostat as set forth in said prior application but claiming herein a combination therewith of my present novel form of quickly attachable and detachable, interchangeable wiper blades.

Referring to the drawing, 10 designates a portion of a motor vehicle forming the framework for the windshield 11. Mounted on the portion 10 is a motor 12 arranged to oscillate a shaft 13 in the usual manner, and which shaft extends through the portion 10. Secured to the shaft 13 by screw 14 is a downwardly depending arm 15, provided at its lower end with spaced ears 16 and to which the wiping element may be attached as will be hereinafter described. 17 designates a strip or plate of sheet metal such as brass or iron, folded longitudinally along its axis to form a channel 18. The metal at each edge of the channel is then folded back on itself, as indicated at 19. The width of the portion is substantially equal to the width of the side wall 20 of the channel 18. The metal is then folded on itself to form the channel 21 at each side of the channel 18 to receive a readily removable and interchangeable wiping element 22, composed of strips of resilient material, such as rubber, felt, or the like, and a metal back 50 to be described. The wiping units 22 are held in the channels 21 by a sliding fit, or other renewable fitting. The wiping units 22 are arranged parallel to each other, as shown, and the width thereof is greater than the depth of the channels 18 and 21. When the device is in engagement with the windshield 11, therefore, there is formed by the windshield 11, channel 18 and wiping unit 22, an elongated chamber which is filled with heated air and which serves to heat a relatively large portion of the windshield 11. Secured to or formed integral with the strip or plate 17, centrally of the channel 18 and on the outer face of the plate 17, is a lug or ear 23, perforated as shown and through which, and through perforations in the spaced ears 16, passes a rivet 24 for securing the device to the lower end of the depending arm 15.

Secured at one end of the channel 18, by screws 26 and nuts 27 is a terminal block 28 of insulating material. Embedded in the block 28 is a plate 29 of conducting material, such plate being threaded to receive one of the screws 26. One of the nuts 27 is insulated from the metal 17 by a plate 30 of insulating material. Formed in the block 28 is a recess 31 covered by a plate 32 held in position by the screws 26. Secured to the block 28, within the recess 31, by screws 33, is a thermostatic element 34. Screwing through the metal 17 and through the plate 29 is a screw 35, the inner end of which engages, ordinarily, with the thermostatic element 34. A check nut 36 on the screw 35 holds such screw in adjusted position relative to the thermostatic element 34.

At the end of the channel 18, remote from the block 28, is a screw 37 that passes through the metal 17 and has a nut 38 on its inner end. To the screw 37 is secured one end of a heating element 39, the other end of this element being attached to the screw 33 and, therefore, connected electrically to the thermostatic element 34. By referring to Fig. 3 it will be noted that the lower end of the block 28 is bevelled and such bevelled end acts as a clamp for the upper end of the U-shaped member 40 of insulating material and which material acts to prevent engagement of the heating element 39 with the metal 17. The lower end of the member 40 is secured in position by the nut 38.

One end of the heating element 39 is grounded through the screw 37, metal 17, and depending arm 15, and the other end thereof is connected by conductor 41 to any suitable source of power, as a storage battery or generator with which the ordinary motor vehicle is equipped.

In my present improved invention the wiper elements 22, which may be of any suitable form or type and are one of a plurality of wiping surface edges and blades of rubber, fabric, felt or other textile or composition material, are fitted within metallic rims 50, preferably concave at the back or top, as clearly illustrated in Fig. 4. The plate 17 which forms the channel 18 folded to form the channel 21 at each side of the channel 18 is also formed of a suitable contour with reverse grooved edges, as illustrated at 51, to hold, fit and retain the metal strip or back 50 holding the wiping element 22. Thus the entire blade 22 with its holding back metal plate 50 can be slid transversely of the portion 21 and readily removed or replaced, as well as renewed, by such quick detachment and replacement. Furthermore, it may be, and often is advisable, to interchange one wiping element 22 from one side to the other, as well as to change it end for end in its own channel plate 21, when one side is unduly worn and the other is desired to be placed in advantageous position. Thus I am enabled to quickly fit or slide the entire wiping element out of the holder, turn it end for end, or replace same with another or new wiping element. The increased mass of metal accorded by the strip 50 with the folded portion 21 constituting the holding channel also aid in conserving the heat from the resistance wire 39 within the channel 18, thus still further aiding the efficiency of my present improved device.

Thus it will be appreciated that I can manufacture my holder with the heating element and fit and apply thereto at any time, either on the car or as a complete unit, standard types of windshield wiping elements, the pair of side channels in the holder being adapted to cooperate with and to receive and hold any of the present commercial forms of windshield wiping elements having a metal backing retaining same.

I form a flange 55 on the bottom as a stop or retaining means when the wipers are slid downwardly.

I claim:

As a new article of manufacture, an electrically heated windshield wiper having a metallic strip bent in the form of a central channel and two opposite side channels all opening in the same direction, the central channel having its sides substantially parallel and adapted to receive insulating material and a heating element, with the heating element in open communication with the windshield to which the wiper is applied, said two opposite side channels having an enlarged bight portion, each side channel containing a removable holder carrying a wiping blade, the holder corresponding in form to that of the side channel and being retained in position by the channel edges being closer together than the main portion of the lateral side channels.

JOHN J. McCARTHY.